United States Patent
Fantini et al.

(10) Patent No.: US 7,734,279 B2
(45) Date of Patent: Jun. 8, 2010

(54) METHOD AND SYSTEM FOR CONTROLLING RESOURCES VIA A MOBILE TERMINAL, RELATED NETWORK AND COMPUTER PROGRAM PRODUCT THEREFOR

(75) Inventors: Roberto Fantini, Turin (IT); Fabio Ricciato, Turin (IT); Maura Turolla, Turin (IT)

(73) Assignee: Telecom Italia S.p.A., Milan (IT)

( * ) Notice: Subject to any disclaimer, the term of this patent is extended or adjusted under 35 U.S.C. 154(b) by 601 days.

(21) Appl. No.: 10/575,621

(22) PCT Filed: Oct. 14, 2003

(86) PCT No.: PCT/EP03/11363

§ 371 (c)(1),
(2), (4) Date: Apr. 13, 2006

(87) PCT Pub. No.: WO2005/041605

PCT Pub. Date: May 6, 2005

(65) Prior Publication Data

US 2007/0054655 A1    Mar. 8, 2007

(51) Int. Cl.
*H04M 1/66* (2006.01)
(52) U.S. Cl. .............. 455/411; 455/558; 370/328; 370/329; 370/252; 370/230; 726/2; 726/7; 726/3; 726/4; 726/5
(58) Field of Classification Search .......... 455/411, 455/420, 410, 433, 558; 370/355, 328, 329, 370/252, 230; 709/202–203; 726/2, 3, 4, 726/5, 7
See application file for complete search history.

(56) References Cited

U.S. PATENT DOCUMENTS 5,608,778 A     3/1997   Partridge, III
5,909,491 A  *  6/1999   Luo .......................... 380/270

(Continued)

FOREIGN PATENT DOCUMENTS

GB    2 373 679 A    9/2002

(Continued)

OTHER PUBLICATIONS

3GPP TS 43.020 V5.0.0 (2002-07) Technical Specification 3rd Generation Partnership Project; Technical Specification Group Services and system Aspects; Security related network functions (Release 5) Section 3 : Subscriber identity authentication.*

(Continued)

*Primary Examiner*—Rafael Pérez-Gutiérrez
*Assistant Examiner*—Munjal Patel
(74) *Attorney, Agent, or Firm*—Finnegan, Henderson, Farabow, Garrett & Dunner, L.L.P.

(57) ABSTRACT

Access to resources is controlled via a mobile terminal operatively connected to a network operator, wherein the mobile terminal has an associated authentication module configured for authenticating the mobile terminal with the network operator. The method includes the steps of providing in the mobile terminal at least one facility having authentication capability and adapted for accessing the resources, and authenticating the authentication module with the at least one facility, whereby the at least one facility is authenticated with the network operator via the authentication module.

29 Claims, 6 Drawing Sheets

U.S. PATENT DOCUMENTS

Figure 3:
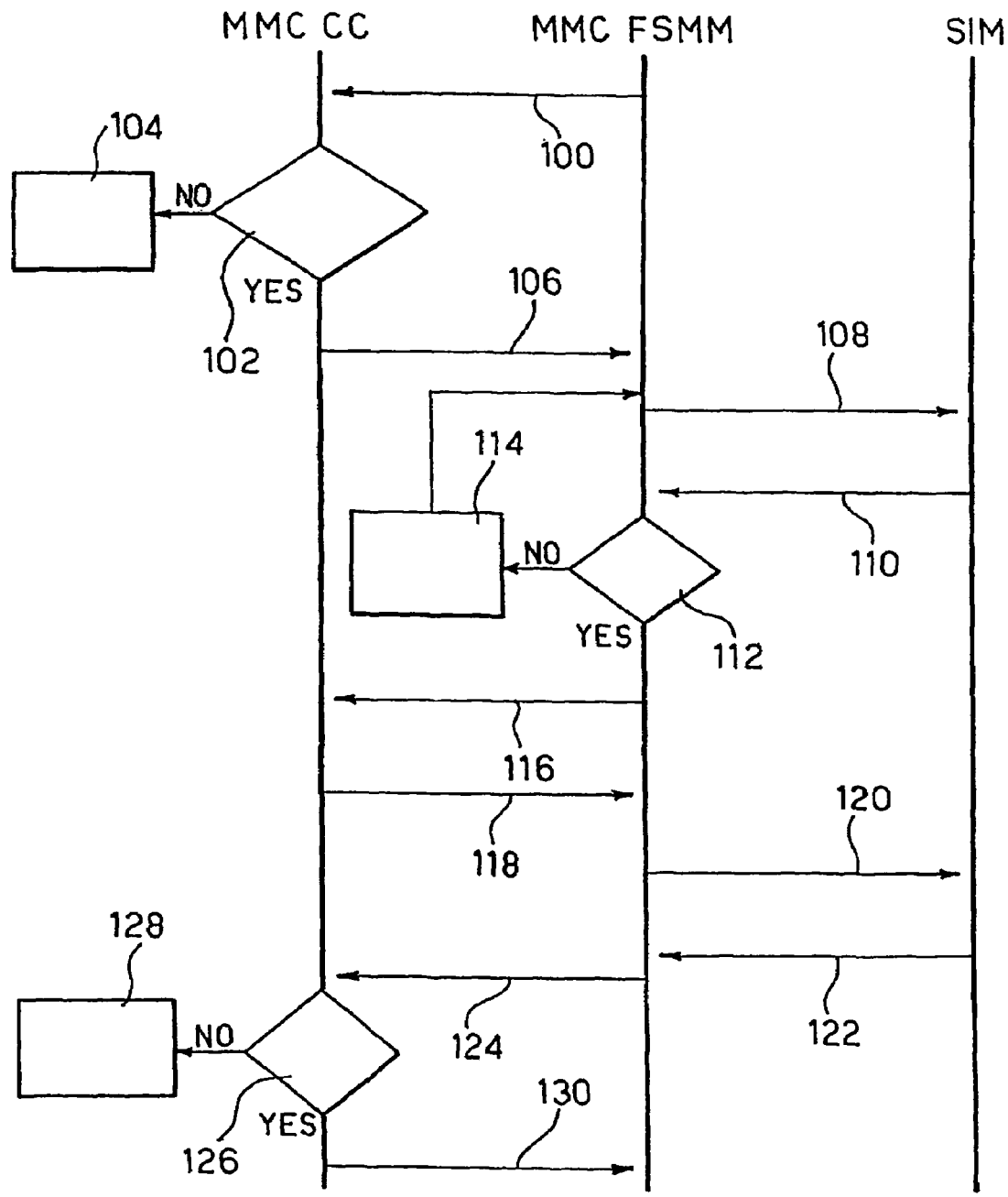
Figure 4:
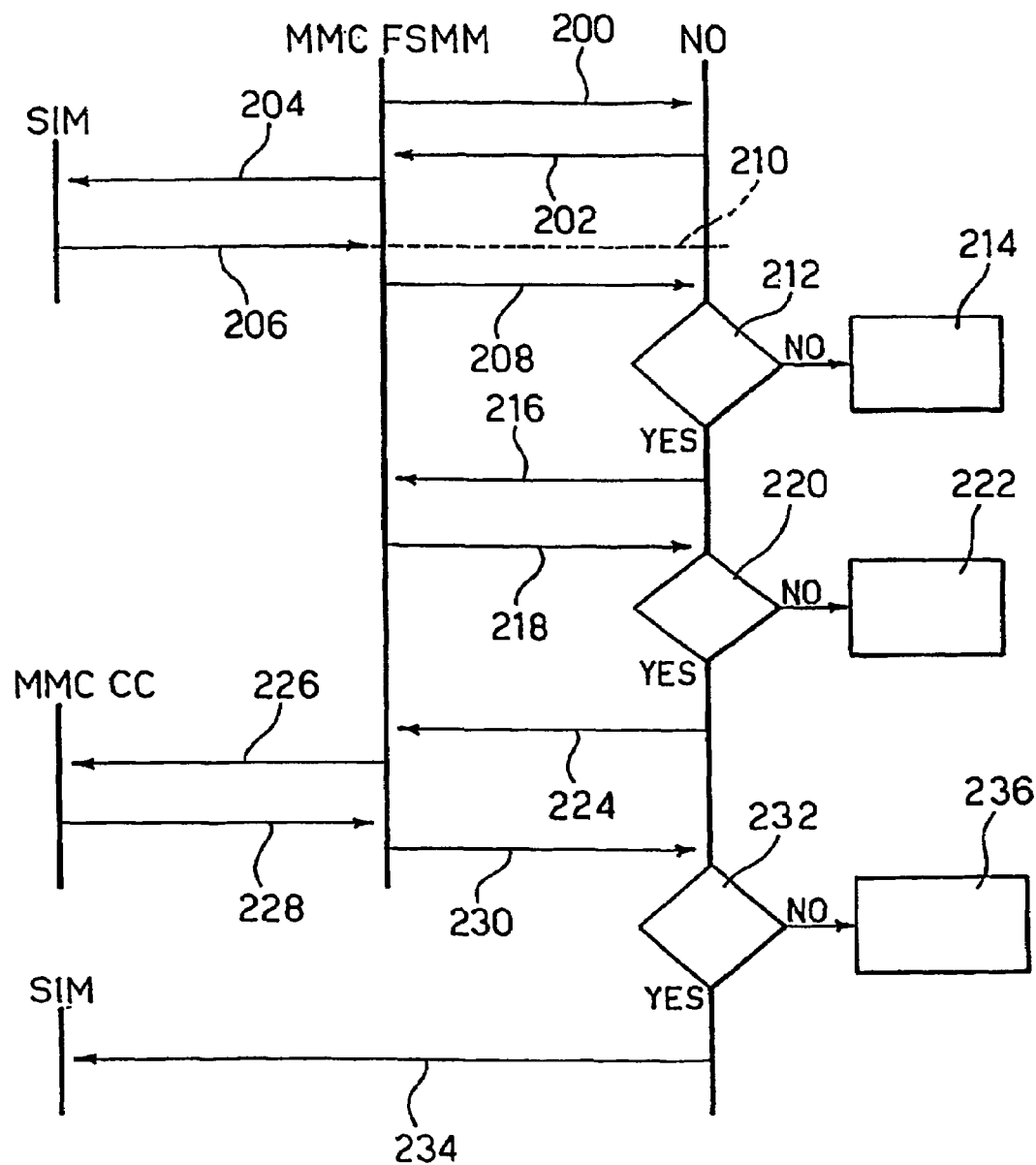

| | | | |
|---|---|---|---|
| 6,091,946 A * | 7/2000 | Ahvenainen | 455/411 |
| 6,397,333 B1 | 5/2002 | Söhne et al. | |
| 6,606,491 B1 * | 8/2003 | Peck | 455/411 |
| 2002/0169717 A1 | 11/2002 | Challener | |
| 2003/0004876 A1 | 1/2003 | Jacobson | |
| 2003/0133270 A1 * | 7/2003 | Liu et al. | 361/728 |
| 2003/0218532 A1 * | 11/2003 | Hussmann | 340/5.8 |
| 2004/0088347 A1 * | 5/2004 | Yeager et al. | 709/202 |

FOREIGN PATENT DOCUMENTS

| | | |
|---|---|---|
| JP | 2001-169359 | 6/2001 |
| WO | WO-99/66752 | 12/1999 |
| WO | WO-03/081934 A1 | 10/2003 |

OTHER PUBLICATIONS

"European Digital Cellular Telecommunication System (Phase 1); Security-Related Network Functions"; ETSI-GSM Technical Specification, GSM 03.20, Version 3.3.2, pp. 1-44, (1992).

"3$^{rd}$ Generation Partnership Project; Technical Specification Group Terminals Specification of the Subscriber Identity Module—Mobile Equipment (SIM-ME) Interface"; Global System for Mobile Communications, 3 GPP TS 11.11 V8.13.0, pp. 1-174, (2005).

"Removable User Identity Module (R-UIM) for CDMA2000 Spread Spectrum Systems" 3$^{rd}$ Generation Partnership Project 2, 3GPP2 C.S0023-0, pp. 1-1 to 1-95, and 5-96 to 5-97, (2000).

* cited by examiner

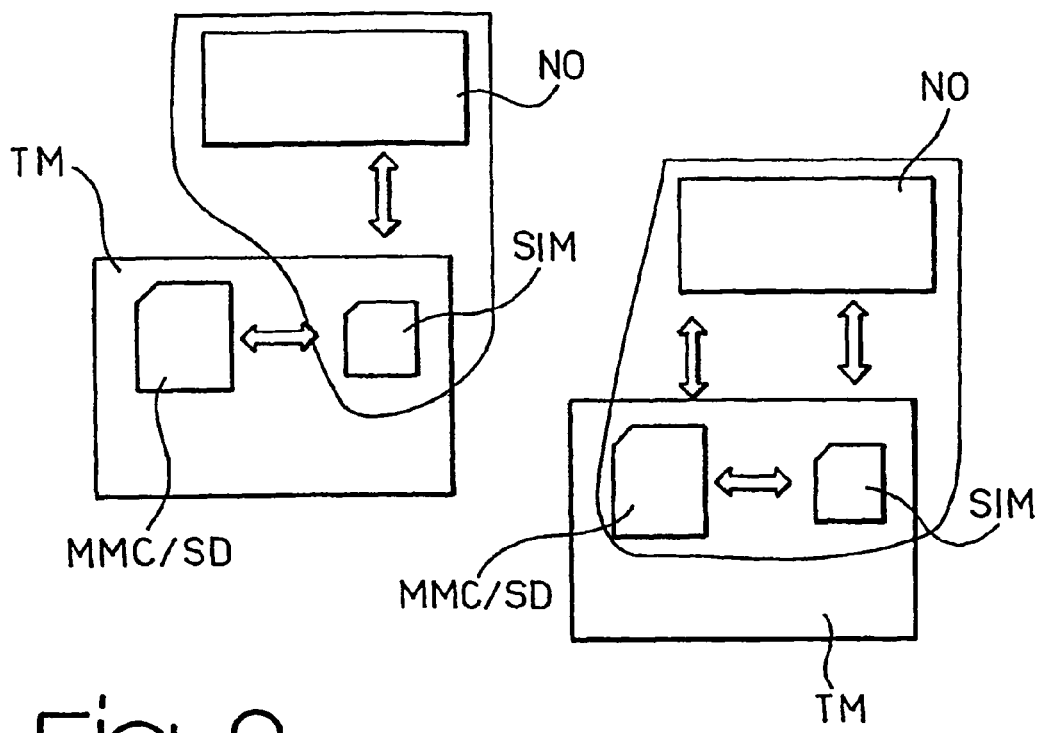
Fig_1
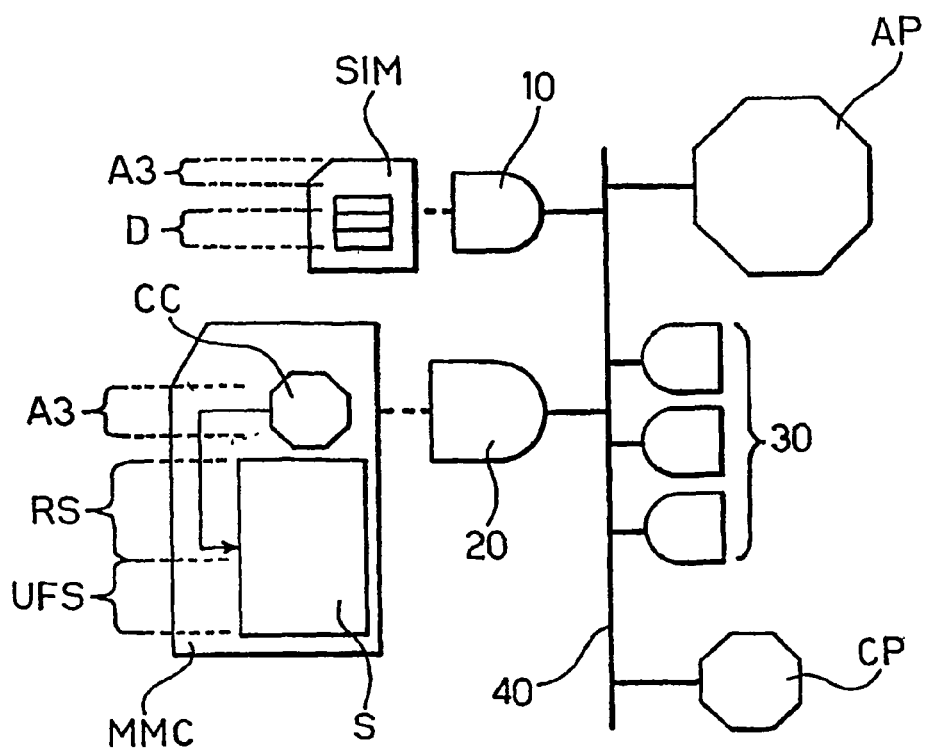
Fig_2

Fig_4

Fig_7
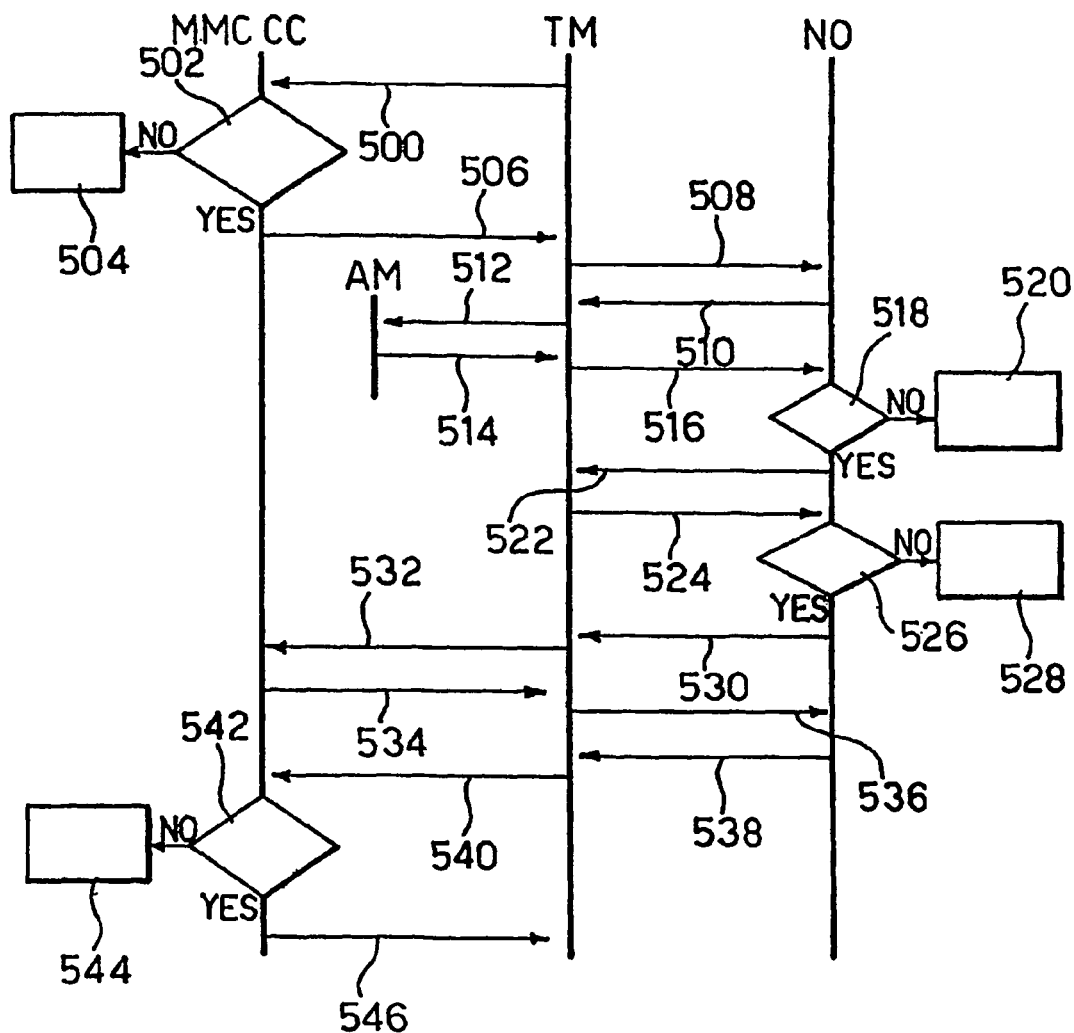

METHOD AND SYSTEM FOR CONTROLLING RESOURCES VIA A MOBILE TERMINAL, RELATED NETWORK AND COMPUTER PROGRAM PRODUCT THEREFOR

CROSS REFERENCE TO RELATED APPLICATION

This application is a national phase application based on PCT/EP2003/011363, filed Oct. 14, 2003, the content of which is incorporated herein by reference.

FIELD OF THE INVENTION

The present invention relates to techniques for controlling resources in mobile terminals such as e.g. mobile phones.

DESCRIPTION OF THE RELATED ART

Next generation mobile phones will generally be more complex than present-day mobile phones. Specifically, a sophisticated processor (the application processor) will be added to the communication processor in charge of performing the digital signal processing tasks and supporting the basic user interface and applications in current mobile phones. Additional peripherals will also expectedly be present.

In present-day mobile phones, the SIM (Subscriber Identification Module) authentication capabilities are used only to register the user with the network operator, as specified in the 3GPP TS 03.20 Specification "Security related network functions". A description of SIM commands and security related functions available in the SIM can also be found in the 3GPP TS 11.11 Specification "Specification of the Subscriber Identity Module-Mobile Equipment (SIM-ME) interface". Present-day mobile phones are thus essentially mobile terminals adapted to be operatively connected to a network operator, each such mobile terminal having an associated authentication module configured for authenticating the mobile terminal with the network operator.

In addition, in US 2002/0169717 a system and a method are described for installing a remote credit card authorization on a system with a TCPA (Termination Customer Provided Access) compliant chipset.

In U.S. Pat. No. 5,608,778 and U.S. Pat. No. 6,397,333 the possibility is generally disclosed of using a cellular telephone as an authenticated transaction controller and within the framework of a copy protection system, respectively.

Finally, in GB-A-2 373 679 the possibility is described of accessing bookmarks in a mobile communication device, in the arrangement disclosed, the memory is neither protected nor authenticated by the SIM.

The Applicant has tackled the problem of controlling the access to resources of a mobile terminal, e.g. a multimedia card or an application processor, restricting such access to authorized/authenticated users.

OBJECT AND SUMMARY OF THE INVENTION

The basic object of the present invention is thus to provide improved exploitation of SIM capabilities within the framework of a sophisticated mobile phone terminal including e.g. an application processor and/or adapted to efficiently support additional peripherals with respect to present-day mobile phone layouts.

According to the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention.

A preferred embodiment of the invention is thus a method of controlling resources via a mobile terminal operatively connected to a network operator. The mobile terminal has an associated authentication module (e.g. a SIM-type card) configured for authenticating the mobile terminal with the network operator. A preferred embodiment of the invention includes the step of providing in the mobile terminal at least one facility having authentication capability and adapted for accessing said resources, and the step of authenticating the authentication module with the at least one facility. The facility is thus authenticated with the network operator via the authentication module.

In brief, the basic idea underlying the invention is to control e.g. access to peripherals and the applications running on the application processor associated with a mobile phone/terminal with the help of the SIM card.

At present, no terminal equipment architectures are known that take advantage of the SIM authentication capabilities to restrict the access to some of the resources available in the terminal or terminal peripherals. The core of the arrangement described herein thus lies in that, in addition to performing authentication towards the network(s), the operator authentication mechanism can likewise authenticate on-board peripherals or applications.

Additionally, the possibility of authenticating peripherals makes it possible to selectively reserve at least part of the peripheral functionalities for use by the operator. The remaining part of the peripheral functionalities can be accessed in a transparent manner by the user applications.

BRIEF DESCRIPTION OF THE ANNEXED DRAWINGS

The invention will now be described, by way of example only, by referring to the enclosed figures of drawing, wherein:

FIG. 1 is a schematic representation of a typical context of use of the arrangement described herein, FIG. 2 is a block diagram showing the reference architecture of the arrangement described herein, and FIGS. 3 to 7 are flow charts exemplary of possible operation of the arrangement described herein.

DETAILED DESCRIPTION OF PREFERRED EMBODIMENTS OF THE INVENTION

As indicated, FIG. 1 is a schematic representation of a typical environment of use of the arrangement described herein. In FIG. 1, two mobile terminals (e.g. two mobile phones) TM are shown included in respective mobile communication networks operated by respective network operators NO. Each of the terminals TM includes a SIM card as well as a MMC/SD (MultiMediaCard/Secure Digital) module. Specifically, the right hand portion of FIG. 1 shows how the network operator NO may enlarge its trusted environment from the SIM card to the added peripherals In order to allow the enlargement of the environment trusted by the network operator NO, a controller and some authentication capabilities, equivalent to those that are typically present in a GSM SIM card (i.e., more generally, a "SIM-type" card), are embedded in the added peripheral.

It will be appreciated that—as used herein—the designation "SIM-type" card is intended to cover also those cards configured for performing within the framework of a system different from a GSM system authentication functions that are equivalent to those functions performed by a SIM card in a GSM system. Exemplary of such "SIM-type" cards are e.g. U-SIM cards (for UMTS systems), R-UIM (as described in the 3GPP2.C S0023 specification in connection with CDMA 2000 Spread Spectrum systems), authentication smart cards for use in WLANs, and the like.

In the arrangement described herein, one added peripheral is represented by a MMC module containing the service application code and data. A typical MMC is only a storage medium, which can store a certain amount of information. In the arrangement described herein an embedded card controller CC is added to the MMC, in order to allow the network operator NO to control a part of this medium and to restrict only to trusted users some services contained in the medium.

In order to perform these tasks the Card Controller has authentication capabilities equivalent to a GSM SIM card. In a GSM SIM card, the authentication capabilities are: the presence of a unique identification number (named IMSI), the presence of a secret authentication key $K_i$, and the possibility to execute the authentication algorithm named A3 (Administration, Authorization, and Authentication). This algorithm uses the authentication key $K_i$ in order to compute a unique response SRES to a given input value RAND.

When a GSM SIM card user tries to connect to the network operator, the network operator identifies the GSM SIM card by means of the IMSI, generates a random number RAND, and sends it to the GSM SIM card. Starting from the value RAND, the GSM SIM card computes the response SRES by means of the authentication algorithm A3 and of its secret key $K_i$.

This response SRES is sent back to the network operator NO. Since the network operator NO knows the GSM SIM card secret key $K_i$, it can evaluate what the expected response SRES is and verify if the received SRES is the same it calculated for itself. If the received response and the computed expected response are the same, then the network operator can successfully authenticate the GSM SIM card.

A similar mechanism can be used to let the network operator NO authenticate the MMC card. For that purpose the card controller embedded in the MMC contains a unique MMC id number (equivalent to the IMSI), a unique secret key $K_{MMC}$ (equivalent to $K_i$), and the capability of performing the A3 algorithm. By means of this authentication procedure, the network operator can trust the MMC card and operate with it.

Moreover, as will be detailed in the following, a similar procedure can be used to restrict the access to the MMC card contents only to trusted users. In this case, when a user tries to access the MMC card, the MMC Card Controller CC requests the user to authenticate itself. The user authenticates itself by means of the GSM SIM card. As will be detailed later, in this case, in order to perform the authentication procedure with the MMC card the GSM SIM card must know the secret key $K_{MMC}$ of the MMC card, and must be able to perform the authentication algorithm A3 using the key $K_{MMC}$ instead of its own key $K_i$.

As shown in FIG. 2, a possible architecture for the arrangement described herein is comprised of:
- an application processor AP,
- a communication processor CP,
- a smart card reader 10
- a Multimedia/Secure Digital (MMC/SD) reader 20
- one or more additional peripherals 30 (e.g. USB, infrared, serial ports, Bluetooth serial port) having associated respective interfaces,
- a Subscriber Identity Module (SIM) card
- a Multimedia/Secure Digital (MMC/SD) card, configured in order to include authentication capabilities.

More in detail, the application processor AP is an off-the-shelf processor running an advanced operating system (in a preferred case, Embedded Linux). The processor is not protected by any logic and is not specifically authenticated. It runs the basic applications required to manage the mobile terminal.

The user can control these applications and can insert own programs. At least in principle, an expert user may maliciously control also the inner part of the operating system: stated otherwise, the operator NO has no knowledge of what the processor AP is doing and cannot trust on the behavior of these applications.

The application processor AP communicates with the rest of the system through a bus 40. Specifically, it will communicate with the other peripherals via read and write operations performed through this bus.

The communication processor CP is in charge of establishing the communication channels towards the network. It communicates with the radio frequency part of the terminal TM and processes the digital information. It strictly communicates with the SIM card to manage the network authentication phase and basic functionalities such as address book, text messages and so on. Additionally, it provides the SIM card with some API (Application Programming Interface) functionalities to be used through a so-called SIM toolkit.

The smart card reader 10 is adapted to manage the SIM card, e.g. by delivering to it the commands coming from the communication processor CP. In the arrangement described herein the smart card reader 10 is made available to the application processor AP and to the other peripherals 30. In that way the authentication features are made available not just to the network but also locally to the different devices or applications in the mobile terminal TM. The smart card reader 10 can thus be used by different peripherals through a shared bus such as the bus 40.

The multimedia/secure digital reader 20 is configured to read the MMC/SD card. The corresponding interface is in compliance with MultiMediaCard (MMC) Specification V2.2 and the SD Memory Card Specification V1.0. As previously stated, in comparison with a usual MMC/SD card (used only for storage purposes), in the arrangement described herein a modified MMC/SD card is used, which has the same interface to access data stored in the MMC/SD card, but which also includes some logic (the card controller CC) to perform the authentication tasks. This can be accomplished just with some logic which only performs the exchange of the value RAND, the management of the key $K_{MMC}$ and the generation of the response SRES; however more complex logic which also performs other service specific tasks can be used, or even an embedded processor.

The additional peripherals 30 can be connected and accessed by the application processor AP. The respective interfaces can include the logic required in order to authenticate the SIM card as better described in connection with the (modified) MMC/SD card.

Of course, the authentication method described herein can be used also with other peripherals different from a MMC card, provided these have a controller similar to the card controller CC, adapted to perform the authentication operations. The access method will thus be identical to the one described in connection with the MMC card, while the application processor AP will use another interface in order to communicate with the peripheral in question.

As is well known, the SIM card is a small printed circuit (PC) board adapted to be inserted in any GSM-based mobile phone when signing on as a subscriber. It contains the subscriber details, security information and a memory area for a personal directory of numbers. The card includes a microchip that stores information and encrypts voice and data transmissions, thus making it difficult and virtually impossible to eavesdrop on-going calls. The SIM card also stores data D that identifies the caller to the network, i.e. the IMSI (International Mobile Subscriber Identity, which uniquely identifies the SIM card owner) and an authentication key $K_i$ Additionally, the SIM card can perform the so-called A3 or AAA (Administration, Authorization, and Authentication) algorithm.

In order to perform the authentication scheme considered herein, a MMC/SD card including at least some authentication capability is required: the card must contain some logic (e.g. a card controller) allowing access to the contents therein only when the authentication algorithm has been successfully completed. In the MMC/SD card, a processor or some accelerators will be present that can export functions or procedures. The application processor AP can ask for a Remote Procedure Call passing to the MMC/SD the argument of the function. In that way, the application can be partitioned between the application processor AP and the MMC/SD.

The sensitive part of the application, adapted to give value to the service(s) rendered by the system, can be inserted in the MMC/SD. The arrangement described herein is adapted to enhance mobile terminal performance based on "scalable" solution starting from a simple mobile terminal. The concept can be extended to other peripherals that are required for providing a service. In that way, the portfolio of services offered is no longer limited by the resource of the terminal.

A card controller CC is in charge of keeping track of those services that require authentication. In order to do so, the controller CC may partition the memory space of the card in two regions. One of these (indicated as UFS) is for free services and data, while the other (indicated as RS) is for services requiring authentication. The card controller CC adjusts the amount of space reserved to one area with respect to the other as new space becomes necessary for authentication-requiring services.

In the proposed architecture, it is assumed that the MMC/SD card controller will perform an authentication algorithm exactly as is the case for the SIM card. With that purpose, the card contains a unique MMC "id card" number, a unique 128 bit authentication key, $K_{MMC}$, which is the equivalent of the $K_i$ key for a SIM card. Additionally it can run the GSM A3 (or AAA) algorithm, which is used in conjunction with the application key $K_{MMC}$ in order to complete authentication, as specified in 3GPP TS 03.20 Standard "Security related network functions".

The application processor is configured for running a number of software modules.

A basic one of these is the operating system (OS), such as e.g. a Linux operating system. The operating system is in charge of managing the processes on the application processor AP, communication with the peripherals 30, the first user authentication, and the file system.

The OS is a multi-user OS, adapted to grant simultaneous access to at least two different users, namely:
 the SIM card owner, who logs on locally and can run programs downloaded from the network or its own programs, and
 the network operator NO, which can log on remotely, and can perform management tasks, such as e.g. the registration of a MMC/SD card on a SIM upon successful SIM authentication, as better described in the following.

Optionally, also other users, as for example third parties offering other services, can be supported by the OS.

The smart card reader interface module manages communication with the SIM card. It translates a user readable protocol into the smart card command protocol. The applications involved can be both system applications, which manage the user interaction and the man-machine interface (MMI), and algorithms that perform certain functionalities or user specific applications.

The MMC/SD filesystem management module performs the management of the MMC/SD storage space. The presence of the MMC/SD is thus made transparent to the application. It becomes part of the usual filesystem of the operating system, by leaving access to the files stored into the device essentially unchanged with respect to the case of a file stored in the usual file storage memory. As better detailed in the following, before access of an application to the MMC/SD card, this module performs a dialogue with the card controller in order to authenticate the user SIM card.

By means of the architecture shown in FIG. 2, the operator NO can improve performance of the terminal equipment TM with advanced services stored in a MMC/SD card, thus exploiting the computing power of the application processor AP and/or additional features provided by possibly customized peripherals, while at the same time controlling the availability of these services by restricting access to SIM authenticated users only.

In the arrangement described herein, a proprietary application (such as a game application) may be executed in a transparent mode by the application processor AP, while the basic data and functions related thereto are stored in the MMC/SD card.

As detailed in FIG. 3, when the application processor AP requests a Remote Procedure Call which involves the MMC/SD card, the MMC/SD filesystem management module (indicated MMC FSMM) initiates (step 100) a dialogue with the MMC/SD card controller CC (MMC CC). The card controller verifies (step 102) if the service that the module is trying to access is a "free" service (UFS) or a "restricted" service (RS) requiring authentication.

If the service does not require authentication, the service is simply provided (step 104).

If the service requires authentication, the card controller CC initiates a procedure that, through SIM authentication, checks if the current user can access the requested service.

In the first place, the card controller CC passes (step 106) the MMC/SD card number to the management module, which verifies (steps 108 and 110) if the MMC/SD card is registered in the SIM card of the user: a MMC/SD card is registered in the SIM card if the MMC/SD card number and its authentication key $K_{MMC}$ are stored in the SIM card.

If this is not the case, then this is the first time that this MMC/SD card is used with that SIM, and a registering procedure involving the network operator must be performed (step 114), as better detailed in the following later.

Conversely, if the MMC/SD card number and authentication key are found in the SIM card, the management module acknowledges the card controller (step 116) and continues the access procedure. The card controller sends (step 118) a random value RAND to the management module. The module passes (step 120) the RAND value to the SIM together with the command RUN GSM ALGORITHM.

The SIM uses the value RAND and the MMC/SD authentication key $K_{MMC}$ as an input for the algorithm $A_3$, which generates the value SRES (step 122). The module sends (step 124) SRES to the card controller. The card controller compares (step 126) this value with the value of SRES calculated by using its stored key $K_{MMC}$.

If the comparison is unsuccessful, the authentication phase is aborted (step 128).

Conversely, a successful comparison of the SRES values provides the authentication and grants access to the MMC/SD card contents (step 130). These can be, for example, the application code and data of an advanced service either downloaded by the network or embedded in the card (e.g, games, transaction and distributed applications, MP3s).

As previously stated, the authentication procedure here described can be completed only if the MMC/SD card is registered in the SIM. If the MMC/SD card number passed by the card controller is not found in the SIM card, the MMC/SD filesystem module MMC FSMM starts the procedure shown in FIG. 4.

As a first step (step 200) the module opens a connection with the network operator NO, and performs the classical SIM card authentication algorithms: the network sends (step 202) a Random Number (RAND) to the management module, and the module (step 204) passes the RAND to the SIM together with the command RUN GSM ALGORITHM. The SIM uses the value RAND and the authentication key $K_i$ as input for the algorithms $A_3$ and $A_8$, which generate respectively the values SRES and $K_c$. The SIM module sends SRES and $K_c$ to the MMC FSMM module (step 206) and this latter in turns relays these values to the network. This occurs in a step 208, preferably over an enciphered link designated 210. The value $K_c$ is used by the mobile equipment TM to encipher the communication with the network.

The network compares (step 212) the value for SRES with the value of SRES calculated locally by means of the $K_i$ key, which is known to the network. The comparison of these SRES values negates (step 214) or recognizes authentication (step 216).

Once the SIM card is authenticated with the network and a secure enciphered communication link is established, the MMC/SD filesystem management module should require the network to authenticate the MMC/SD card. This is accomplished by sending (step 218) the MMC/SD card number to the network: the network verifies (step 220) that the number is an available one and that the SIM identified user is authorized to use that MMC card.

A negative outcome of comparison leads to service failure (step 222). In the case of a positive outcome authentication of the MMC card is effected with the same authentication procedure previously described, i.e.:

the network sends a random number RAND to the module (step 224), which in turn passes (step 226) this number and the command RUN GSM ALGORITHM to the MMC/SD card controller MMC CC;

the card controller runs the authentication algorithm (i.e. A3) with the value RAND and its authentication key $K_{MMC}$ as the inputs, and it generates a response, SRES, which is sent back (step 228) to the management module;

this latter module passes (step 230) SRES to the network; the network compares (step 232) this response with the value SRES calculated locally; and if the comparison is successful, the network authenticates the MMC/SD card; alternatively, if the comparison is unsuccessful, the authentication phase is aborted (step 236).

Once the MMC/SD card is authenticated, the networks registers (step 234) the MMC/SD card number and the authentication key $K_{MMC}$ in the SIM card. From here onwards the MMC/SD card will be recognized as "registered", and the authentication procedure initiated by the card controller will be performed as described previously.

The same authentication procedure described in the foregoing in connection with access to a MMC/SD card, can be implemented in order to restrict access to whatever peripheral possibly associated with the terminal TM.

This is possible as long as an authentication module equivalent to the card controller CC is embedded in the peripheral and the driver module of the peripheral is configured in order to manage the dialogue with this controller.

Since the authentication keys and the registering information are stored in the SIM card and in the peripheral controller, the peripheral can still be used with the registered SIM card even if the terminal is changed.

This is made possible by the availability of a SIM card that can perform the authentication algorithm $A_3$ using the peripheral authentication key, $K_{MMC}$, instead of its authentication key $K_i$. Moreover, the SIM card will provide the possibility to store in a protected manner the secret authentication key of the peripheral, $K_{MMC}$.

As an alternative, the MMC/SD card can be used only to store the fundamental data of new services, instead of both data and procedures. In that case, a processor embedded in the MMC/SD card will not be required, since only a minimum amount of logic necessary to implement the card controller functionalities is required.

The authentication mechanism will remain unchanged, the only difference being that, instead of being started when the application processor asks for a Remote Procedure Call involving the MMC/SD, the mechanism will be started when the application processor tries to access the portion of memory that the card controller has reserved for authentication requiring data.

The authentication arrangement described herein can be applied also to a non-GSM wireless connection (e.g. a WLAN environment), as long as the following elements are present:

i) a MMC/SD card fulfilling the following requirements:
it is identified by a public identifier (MMC id number);
it has authentication capabilities (e.g. a $K_{MMC}$ secret key to be used in conjunction with the A3 algorithm);
it can offer services (both free or upon a successful authentication of the user) to a requesting terminal;

ii) a terminal equipment TM, which can communicate by means of a wireless connection (e.g. a WLAN, or a GPRS link) with a network operator NO, and which can request services from the MMC/SD card: the terminal equipment TM will contain an authentication module AM which provides means to authenticate the user with the network operator (e.g. it implements any of a classical username+password scheme, an EAP client for WLAN, or be the SIM card with GPRS); optionally, the authentication module AM can provide means to authenticate the MMC/SD card;

iii) a network operator NO that can communicate by means of a wireless connection (e.g. WLAN or GPRS) with the terminal equipment TM and contains the elements required to authenticate both the user and the MMC/SD card.

Figure 5:
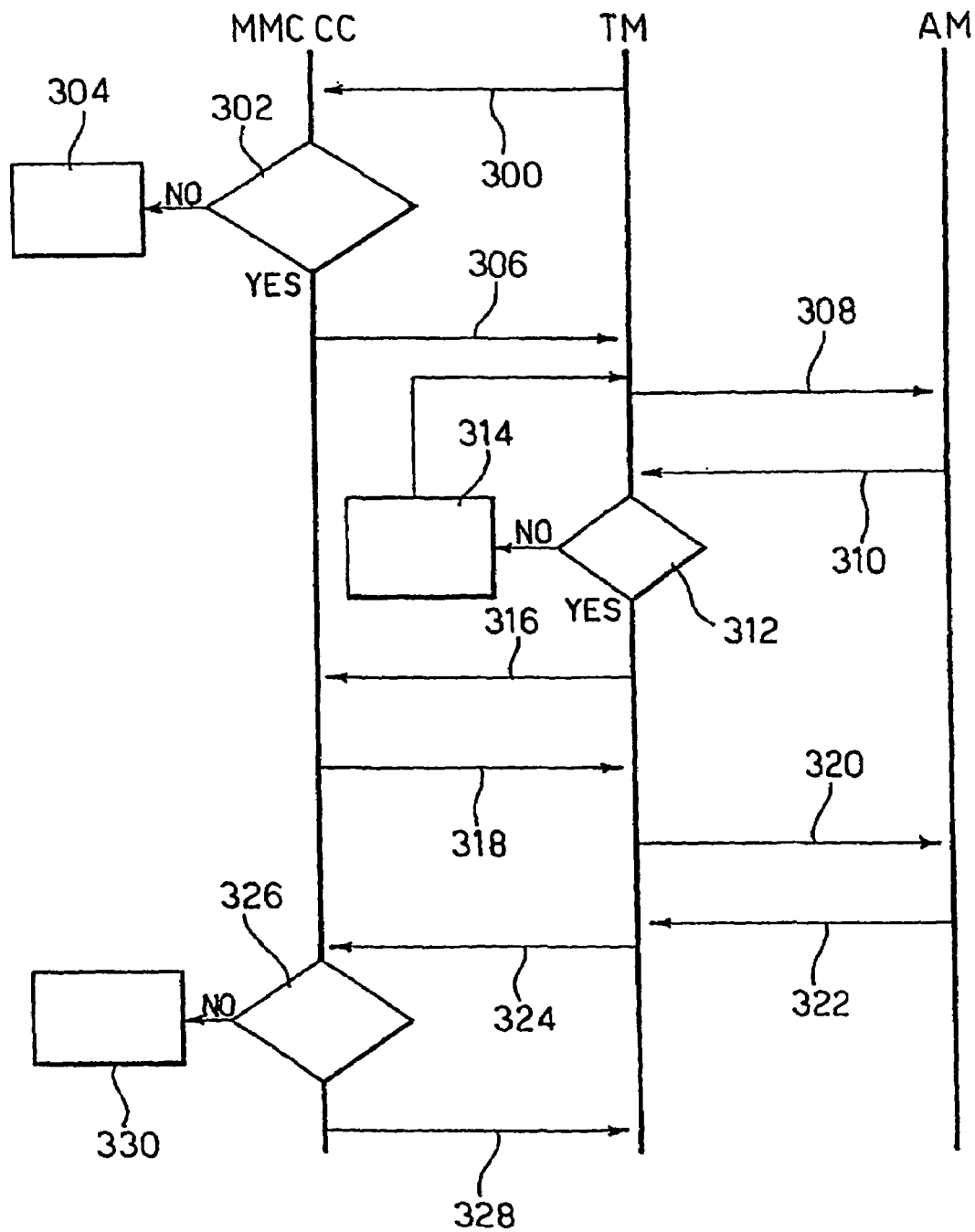

FIG. 5 provides a description of the procedure which allows access to services offered by the MMC/SD card in the case that the authentication module AM can authenticate both the user to the network and the user to the MMC/SD card.

As is shown, the following steps are involved:

the terminal equipment TM requests a service to the MMC/SC card controller CC (step 300);

the MMC/SD card controller CC checks (step 302) whether the requested service is free or requires authentication; If it is free, the MMC/SD card controller CC provides the service (step 304);

otherwise the MMC/SD card controller CC sends (step 306) its MMC id number to the terminal equipment TM; the terminal equipment TM verifies (steps 308 and 310) if the MMC id number is registered in the authentication module AM;

if the MMC id number is not registered in the authentication module AM, the terminal equipment TM starts a registration procedure (step 314); by means of that procedure, the terminal equipment TM asks to the network operator NO to register the required MMC id authentication information in the authentication module AM, as will be better detailed later;

if the MMC id number is registered in the authentication module AM, the terminal equipment TM acknowledges (step 316) the MMC/SD card controller CC;

the MMC/SD card controller CC requests (step 318) to the terminal equipment TM to perform authentication;

the terminal equipment TM submits (step 320) the authentication request to the authentication module AM;

the authentication module AM performs authentication and sends (step 322) the reply to the terminal equipment TM;

the terminal equipment TM sends (step 324) the reply to the MMC/SD card controller CC;

the MMC/SD card controller CC verifies (step 326) if authentication is successful, and if it is successful provides the requested service (step 328); otherwise the authentication phase is aborted (step 330).

As shown at step 312 in FIG. 5, if not available with the authentication module AM, the necessary information for authentication is downloaded from the network operator NO.

Figure 6:
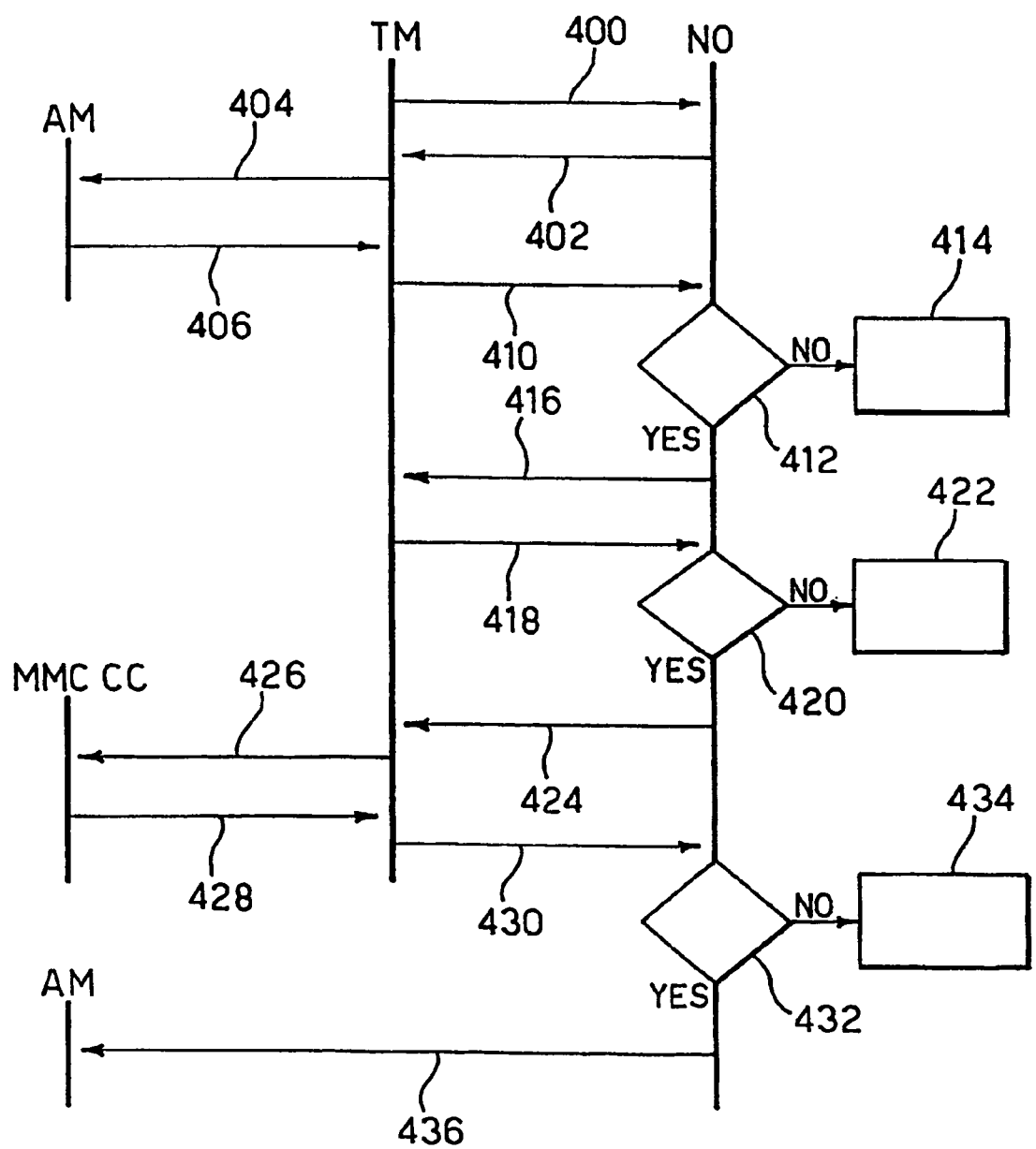

This is accomplished by means of a registration procedure that is presented in FIG. 6 and involves the following steps:

the terminal equipment TM opens a connection with the network operator NO (step 400);

the network operator NO requests (step 402) user authentication from the terminal equipment TM, which in turn submits (step 404) the request to the authentication module;

the authentication module AM responds to the authentication request (step 406) and the terminal equipment submits (step 410) the authentication reply to the network operator NO;

the network operator No verifies (step 412) if authentication is successful; if unsuccessful, the authentication phase is aborted (step 414); if authentication is successful, the network operator NO acknowledges the terminal equipment TM (step 416);

the terminal equipment TM sends (step 418) the MMC id number to the network operator NO;

the network operator NO verifies (step 420) if the user is allowed to use the requested service; if the user is not allowed, service failure occurs (step 422);

if the user is allowed, the network operator NO sends (step 424) to the terminal equipment TM an authentication request for the MMC/SD card;

the terminal equipment TM submits (step 426) the authentication request to the MMC/SD card; the MMC/SD card sends the reply to the terminal equipment TM (step 428);

the terminal equipment TM submits the reply to the network operator NO (step 430);

the network operator NO (step 432) checks if the MMC/SD card authentication is successful; if not successful, the authentication procedure is aborted (step 434); if successful, the network operator NO sends (step 436) to the terminal equipment TM the information required to complete authentication with the MMC/SD card; the terminal equipment stores in the authentication module the authentication information.

The presence of an advanced authentication module AM that can "learn" from the network operator how to provide authentication via the MMC/SD card avoids that the network operator NO may be involved in the authentication procedure each time that the user tries to use an authentication-requiring service offered by the MMC/SD card.

However, this module can be reduced to a classical authentication module that establishes the connection with the network operator NO, and the authentication procedure can be implemented as shown in FIG. 7 and detailed in the following steps:

the terminal equipment TM requests a service to the MMC/SC card (step 500);

the MMC/SD card checks (step 502) whether the requested service is free or requires authentication; if the service is free, the MMC/SD card provides the service (step 504), otherwise the MMC/SD card sends (step 506) its MMC id number to the terminal equipment TM;

the terminal equipment TM opens (step 508) a connection with the network operator NO, and the network operator NO requests (step 510) user authentication from the terminal equipment TM;

the terminal equipment TM submits (step 512) the request to the authentication module An, and the authentication module AM responds to the user authentication request (step 514);

the terminal equipment TM submits the authentication reply to the network operator NO (step 516), and network operator NO verifies (step 518) if authentication is successful;

if unsuccessful, authentication is aborted (step 520); if authentication is successful, the network operator NO acknowledges (step 522) the terminal equipment TM;

the terminal equipment TM sends (step 524) the MMC id number to the network operator; the network operator NO verifies (step 526) if it has the information required to authenticate the requested MMC id number;

if the information is not available, service failure occurs (step 528); if the information is available, the network operator NO acknowledges (step 530) the terminal equipment TM that authentication can be performed;

the terminal equipment TM acknowledges (step 532) the MMC/SD card that authentication can be performed and the MMC/SD card requests (step 534) the terminal equipment TM to perform authentication;

the terminal equipment TM submits (step 536) the authentication request to the network operator NO; the network operator NO performs authentication and sends (step 538) the reply to the terminal equipment TM;

the terminal equipment TM sends (step 540) the reply to the MMC/SD card; the MMC/SD card verifies (step 542) if authentication is successful;

if unsuccessful, authentication is aborted (step 544); if successful, the MMC/SD card provides the requested service to the terminal equipment TM (step 546).

Of course, without prejudice to the underlying principles of the invention, the details and the embodiments may vary, also appreciably, with reference to what has been described by way of example only, without departing from the scope of the invention as defined by the annexed claims.

The invention claimed is:

1. A method of controlling access of a user to resources provided in at least one peripheral facility in a mobile terminal, said mobile terminal being operatively connected to a network operator, the method comprising the steps of:
   providing in said mobile terminal a subscriber identification module;
   providing in said mobile terminal an authentication module associated with the subscriber identification module;
   providing in said mobile terminal said at least one peripheral facility having authentication capability, said at least one peripheral facility being different from said subscriber identification module or the authentication module;
   authenticating said authentication module with said at least one peripheral facility;
   authenticating said authentication module with said network operator;
   authenticating said at least one peripheral facility with said network operator via said authentication module; and
   controlling access of the user to said resources based on a result of said authenticating said at least one peripheral facility with said network operator.

2. The method of claim 1,
   wherein said subscriber identification module includes a SIM-type card, the method further comprising:
   at least partly incorporating said authentication module to said SIM-type card.

3. The method of claim 1, comprising the steps of:
   associating with said at least one peripheral facility, a respective authentication key; and
   configuring said authentication module for performing an authentication procedure of said at least one peripheral facility by using said respective authentication key.

4. The method of claim 1, comprising the step of selecting said at least one peripheral facility from the group of:
   a media card adapted to provide access to respective media services, and
   a peripheral associated with said mobile terminal.

5. The method of claim 4, wherein said media card is an MMC/SD card.

6. The method of claim 4, comprising the steps of:
   associating with said mobile terminal at least one media card; and
   at least partly embedding in said media card a respective authentication module for authenticating said authentication module associated with the subscriber identification module with said media card.

7. The method of claim 4, comprising the steps of:
   providing in said mobile terminal at least one peripheral; and
   at least partly associating with said at least one peripheral a respective authentication module for authenticating said authentication module associated with the subscriber identification module with said at least one peripheral.

8. The method of claim 1, comprising the step of including in said resources at least a first set of resources selectively reserved for use by said network operator and a second set of resources adapted to be accessed in a transparent manner by user applications.

9. The method of claim 1, comprising the step of including in said mobile terminal an application processor configured for running at least part of said resources.

10. The method of claim 1, comprising the step of configuring said authentication module for performing an authentication algorithm known as A3 (Administration, Authorization, and Authentication).

11. The method of claim 1, wherein said steps of
    authenticating said authentication module with said network operator and said at least one peripheral facility are performed by means of a same authentication algorithm with respective authentication keys.

12. The method of claim 1, wherein, as a result of the user's attempt of accessing the resources provided in said at least one peripheral facility, further comprises the steps of:
    requesting the user to authenticate itself; and
    allowing the user access to the resources provided in said at least one peripheral facility as a result of the user's authentication by means of said authentication module.

13. The method of claim 12, wherein said authentication module has an authentication key and said user's authentication by means of said authentication module includes performing said authentication by using a respective key associated with said at least one peripheral facility in the place of the key of said authentication module.

14. A computer readable medium encoded with a computer program product loadable into a memory of at least one computer, the computer program product comprising software code portions capable of performing the steps of any one of claims 1 to 3 and 4 to 13.

15. A system for controlling access of a user to resources provided in at least one peripheral facility in a mobile terminal, said mobile terminal being operatively connected to a network operator, comprising:
    a subscriber identification module;
    an authentication module associated with the subscriber identification module, said authentication module being configured for authenticating said subscriber identification module with the network operator; and
    at least one peripheral facility having authentication capability,
    wherein said authentication module is also configured for authenticating itself with said at least one peripheral facility, whereby said at least one peripheral facility is authenticated with said network operator via said authentication module.

16. The system of claim 15, wherein said subscriber identification module includes a SIM-type card, and said authentication module is at least partly incorporated to said SIM-type card.

17. The system of claim 15, comprising a respective authentication key associated with said at least one peripheral facility, said authentication module being configured for performing an authentication procedure of said at least one peripheral facility by using said respective authentication key.

18. The system of claim 15, wherein said at least one peripheral facility is selected from the group of:
    a media card adapted to provide access to respective media services, and
    a peripheral associated with said mobile terminal.

19. The system of claim 18, wherein said media card is an MMC/SD card.

20. The system of claim 18, comprising:
   at least one media card associated with said mobile terminal; and
   a respective authentication module for authenticating said authentication module associated with the subscriber identification module with said media card.

21. The system of claim 18, comprising:
   at least one peripheral associated with said mobile terminal; and
   a respective authentication module for authenticating said authentication module associated with the subscriber identification module with said peripheral.

22. The system of claim 15, wherein said resources comprises at least a first set of resources selectively reserved for use by said network operator and a second set of resources adapted to be accessed in a transparent manner by user applications.

23. The system of claim 15, said mobile terminal comprises an application processor configured for running at least part of said resources.

24. The system of claim 15, wherein said authentication module is configured for performing an authentication algorithm known as A3 (Administration, Authorization, and Authentication).

25. The system of claim 15, wherein said authentication module is configured for authenticating itself with said network operator and said at least one peripheral facility by means of a same authentication algorithm with respective authentication keys.

26. The system of claim 15, wherein the system is configured for performing, as a result of the user's attempt of accessing said resources provided in said at least one peripheral facility, the steps of:
   requesting the user to authenticate itself, and
   allowing the user access to said resources provided in said at least one peripheral facility as a result of the user's authentication by means of said authentication module.

27. The system of claim 26, wherein said authentication module has an authentication key and said authentication module is configured for performing said user's authentication by using a respective key associated with said at least one peripheral facility in the place of the key of said authentication module.

28. A telecommunication network comprising a system according to any one of claims 15 to 17 and 18 to 27.

29. The network of claim 28, wherein said network is a wireless network.

* * * * *